Mar. 27, 1923.
E. BEACH.
SPRING WHEEL.
FILED FEB. 11, 1920.
1,449,723.
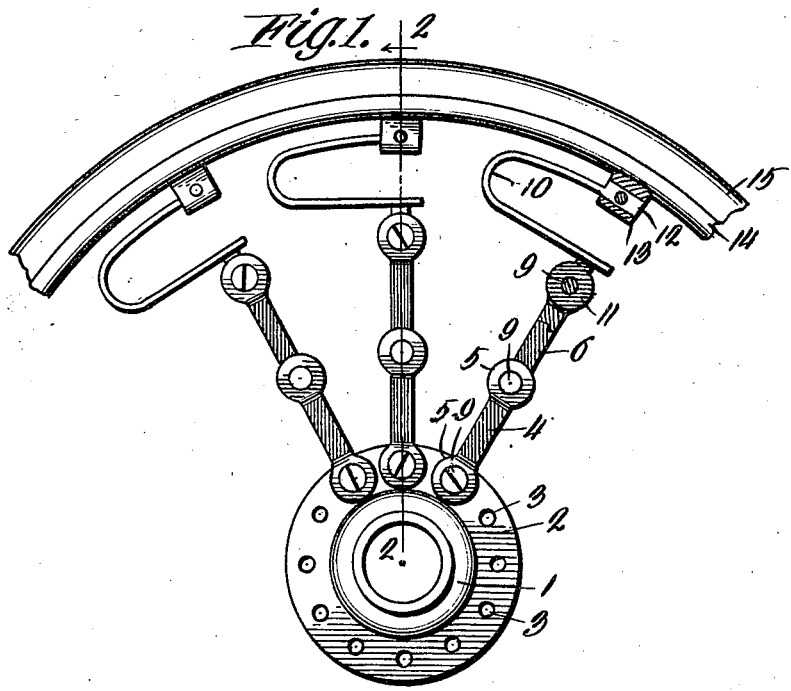
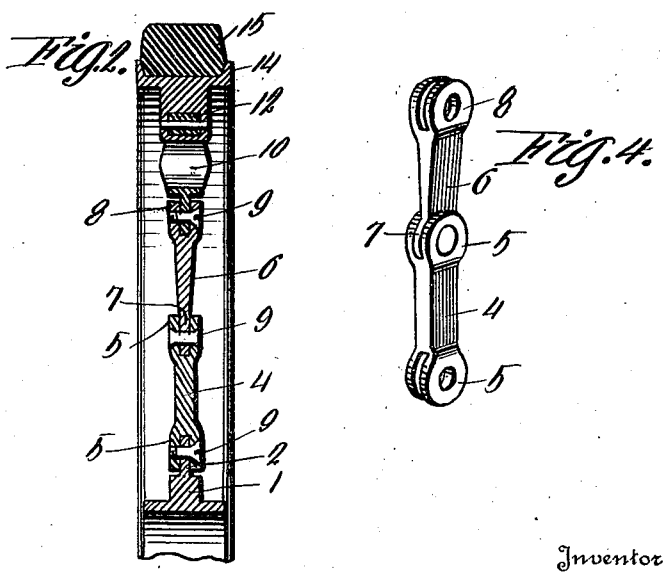
WITNESSES
Guy M. Spring
Chas. E. Smith
Inventor
EDGAR BEACH
By Richard B. Oliver
Attorney Patented Mar. 27, 1923.

1,449,723

UNITED STATES PATENT OFFICE.

EDGAR BEACH, OF CALEDONIA, NOVA SCOTIA, CANADA, ASSIGNOR OF ONE-HALF TO BRINTON M. HARLOW, OF CALEDONIA, NOVA SCOTIA, CANADA.

SPRING WHEEL.

Application filed February 11, 1920. Serial No. 358,000.

*To all whom it may concern:*

Be it known that I, EDGAR BEACH, a subject of the King of Great Britain, residing at Caledonia, in the county of Queens and Dominion of Canada, have invented certain new and useful Improvements in Spring Wheels, of which the following is a specification.

This invention relates to spring wheels and has for its principal object the production of a wheel which will be cheap of construction and durable, and at the same time, may be easily assembled and disassembled and the various parts thereof easily and quickly replaced.

Another object of this invention lies in the production of a U-shaped spring which is formed so that same may be easily and quickly attached to or detached from the rim of the wheel and the spokes.

A still further object of this invention is the production of simple and efficient spokes which are formed of two segments whereby each segment may be easily and quickly replaced if for any reason this should become desirable or necessary.

The various features of novelty whereby my invention is characterized will herein be pointed out with particularity in the claim; but for a full understanding of this invention and of its various objects and advantages, reference may be had to the following detail description taken in connection with the accompanying drawing, wherein:—

Figure 1 is a fragmentary side elevation of my invention.

Figure 2 is a section taken on the line 2—2 of Figure 1.

Figure 3 is a detail perspective view of the spring used in connection with my invention, and Figure 4 is a detail perspective view of a spoke used in connection with my invention.

Referring to the drawing in detail, it will be seen that 14 represents a rim of ordinary construction which is provided with the solid tire 15. A hub 1 having an annular rib 2 is used with the rim 14 in a manner to be hereinafter fully described. The rib 2 is provided with a series of spaced apart circular openings, a plurality of inner spokes 4 having parallel spaced apart lips upon each end, one pair of the lips 5 fitting over the rib 2 so that the apertures therein will register with the openings 3 whereby the inner spokes may be held to the rib by any suitable means, such as a screw 9. The outer spoke 6 has one end provided with a single lip 7 and the other end provided with a pair of parallel spaced apart lips 8. The lip 7 is provided with an aperture and fits between the upper lips 5 so that a rivet or screw 9 may be passed through the aperture in the lips 5 and 7.

A U-shaped spring 10 preferably formed of flat spring steel has one terminal integrally provided with a tongue 11 which in turn is provided with an aperture. The other terminal of the spring 10 is provided with an integral block 12 which also is provided with an aperture. The tongue 11 is adapted to fit between the lips 8 so that the aperture therein will register with the apertures provided in said lips. A pin or screw 9 is adapted to hold the tongue 11 securedly within the lips 8.

The rim 14 is provided with a series of spaced apart sleeves 13 which are adapted to receive the blocks 12. The blocks 12 are securely held within the sleeves 13 by means of a pin or some other suitable means.

Having thus described my invention it will be seen that each and every part of the invention may be easily assembled and disassembled and that the U-shaped springs will form an efficient and simple resilient means. Although the above description and drawing disclose the preferred form of my invention, I wish it understood that I may make such changes in arrangement construction and combination of parts as will fall within the scope of the appended claim.

Having thus described my invention, what I claim as new is:—

A device of the class described comprising a plurality of U-shaped springs, blocks situated upon the outer terminals of said springs, tongues extending at right angles from the other terminals of said springs and having eyes therein, a rim, a hub, spokes, sleeves situated at spaced intervals on the inner periphery of the rim for receiving said blocks, means for holding said blocks in said sleeves, and means for pivotally connecting said tongues to the outer terminals of said spokes.

In testimony whereof I affix my signature in presence of two witnesses.

EDGAR BEACH.

Witnesses:
FRED HEBB,
CHAS. E. REID.